No. 874,516.
PATENTED DEC. 24, 1907.
A. A. LOW.
CUTTING IMPLEMENT.
APPLICATION FILED MAY 4, 1907.
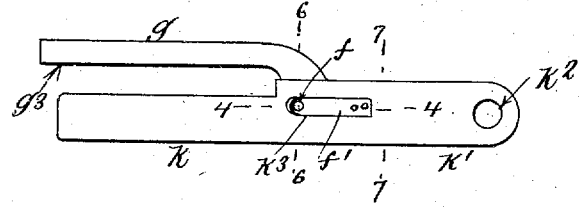
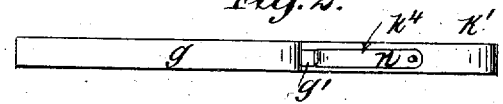
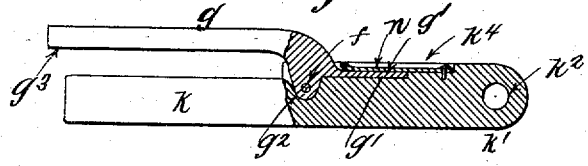
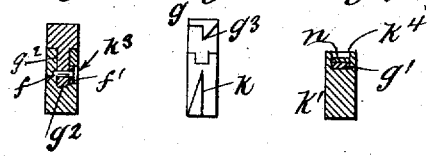
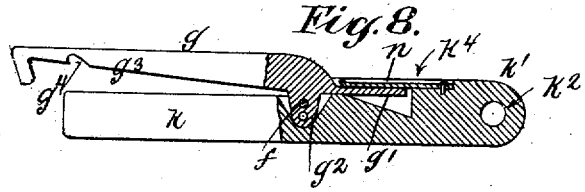
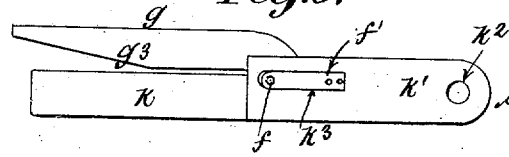
Witnesses:
D. W. Gardner
D. Whitehurst
Inventor:
Abbot Augustus Low
By his Attorney
Geo. Wm Miatt
THE NORRIS PETERS CO., WASHINGTON, D. C.

UNITED STATES PATENT OFFICE.

ABBOT AUGUSTUS LOW, OF HORSESHOE, NEW YORK.

CUTTING IMPLEMENT.

No. 874,516.   Specification of Letters Patent.   Patented Dec. 24, 1907.

Application filed May 4, 1907. Serial No. 371,783.

*To all whom it may concern:*

Be it known that I, ABBOT AUGUSTUS LOW, a citizen of the United States, residing at Horseshoe, St. Lawrence county, and State of New York, have invented certain new and useful Improvements in Cutting Implements, of which the following is a specification.

My improvements relate to cutting implements designed to be carried upon the person to be used in emergency for severing flower stems, cord, and other things relatively small in cross section,—the object being to afford an implement that may be safely carried in the pocket or manipulated without danger or inconvenience to the user.

The invention consists in the construction and arrangement of parts hereinafter described and claimed specifically, distinguishing features being the formation of the pressure guard with a cutting edge on its inner side opposed to the rigid knife blade; the pivoting of the pressure guard upon a fulcrum mounted upon a flat metal spring counter-sunk in the shank of the knife blade whereby said guard may be readily removed, when desired; and the counter-sinking of the rear arm of the pressure guard and its retractile spring in said shank so as to afford a smooth unobstructed handle when the parts are in their normal positions.

In the accompanying drawings, Figure 1, is a side elevation of my improved implement; Fig. 2, an edge view of the same; Fig. 3, a sectional elevation; Fig. 4, a partial section upon plane of line 4—4— Fig. 1; Fig. 5, a front end view of the implement; Fig. 6, a transverse section upon plane of line 6—6— Fig. 1; Fig. 7, a transverse section upon plane of line 7—7— Fig. 1; Fig. 8, a sectional elevation showing a modification in the form of the pressure guard; Fig. 9, shows another modification thereof.

The knife blade $k$, and its shank or handle $k'$, are integral, the rear portion of the shank being formed with a hole $k^2$, by which the implement may be suspended upon a cord, hook or the like, when desired.

The pressure guard $g$, is pivotally connected with the shank by means of a fulcrum $f$, formed integral with a flat spring $f'$, countersunk in the recess $k^3$, formed for its reception in one side of the shank, as will be clearly understood by reference to Figs. 4 and 6. The rear arm $g'$, of the pressure guard $g$, and the flange $g^2$, by which it is pivoted to the shank $k'$, are also countersunk in a suitably formed recess $k^4$, in the shank, as is also the spring $n$, which bears against the rear arm $g'$, and tends constantly to hold the pressure guard $g$, in its normal position. The inner or underside of the pressure guard $g$, is formed with a longitudinal auxiliary cutting edge $g^3$, opposed to the cutting edge of the knife blade $k$, as will be seen more particularly by reference to Fig. 5. This auxiliary cutting edge $g^3$, aids materially in holding the object to be cut against the main knife blade $k$, as well as performing its part in severing the article. Being formed to slip over or past the cutting edge of the stationary blade $k$, this movable cutter $g^3$ also insures the complete severance of the article placed between the cutting edges whenever the guard $g$, is fully depressed by the thumb of the user. This is especially the case in the modification shown in Fig. 8, in which the cutting edge $g^3$, is inclined with relation to the stationary blade $k$, so that a V-shaped opening is created between the cutting edges when in their normal positions with relation to each other resulting in the meeting of the cutting edges when the pressure guard is depressed even at their extreme inner ends.

The implement thus constructed is essentially a shearing implement, in which the movable cutter is opened or returned automatically to its normal position by the retractile spring $n$. By the pressure of the thumb upon the flat outer surface of the guard $g$, the device may thus be quickly and conveniently applied to various uses with absolute safety to the user. On the other hand if it is desired to use the cutting blade $k$, alone as a knife blade, unobstructed by the presence of the guard $g$, the latter may be readily unshipped and removed by pressing outward the spring $f'$, and fulcrum $f$. This method of attachment also affords a convenient means whereby access may be had to both cutting edges for the purpose of sharpening the same.

The cutting edge $g^3$, of the guard $g$, may be formed with a concave portion $g^4$, if desired to hold a flower stem or the like while pressed against the knife edge $k$; and the end of said guard may also be hook shaped, as shown in Fig. 8, facilitating the selecting and drawing forward of flowers, stems &c.

What I claim as my invention and desire to secure by Letters Patent is,

1. In an implement of the character designated, the combination of a rigid knife blade and shank formed integral therewith, of a pivoted pressure guard formed on its inner side with a cutting edge opposed to the knife blade, for the purpose described.

2. In an implement of the character designated, the combination of a rigid knife blade and shank formed integral therewith, a pressure guard opposed to the knife blade and pivoted to the shank thereof by a fulcrum mounted upon a flat spring, for the purpose described.

3. In an implement of the character designated, the combination of a rigid knife blade and shank formed integral therewith, a pressure guard opposed to the knife blade and pivoted to the shank thereof by a fulcrum mounted upon a flat spring, said spring and fulcrum being countersunk in the shank substantially in the manner and for the purpose described.

4. In an implement of the character designated, the combination of a rigid knife blade and shank formed integral therewith, a pivoted pressure guard opposed to the knife blade and formed with a rear arm, and a spring bearing against said rear arm, said rear arm and said spring being countersunk in the shank of the knife blade, for the purpose and substantially in the manner described.

5. In an implement of the character designated, the combination of a rigid knife blade and shank formed integral therewith, and a pressure guard pivotally attached to the shank and formed with a cutting edge opposed to the knife edge and inclined with relation thereto, substantially in the manner and for the purpose described.

6. In an implement of the character designated, the combination of a rigid knife blade and shank formed integral therewith, a pivoted pressure guard opposed to said knife blade and formed with a rear arm, a spring bearing against said rear arm, said spring and rear arm being countersunk in the shank of the knife blade, and a spring fulcrum countersunk in said shank and coupling the parts together, substantially in the manner and for the purpose described.

7. In an implement of the character designated, the combination of a rigid knife blade and shank formed integral therewith and a pressure guard opposed to the knife blade and pivoted to the shank thereof and formed with a hook at its outer end, for the purpose described.

8. In an implement of the character designated, the combination of a rigid knife blade and shank formed integral therewith and a pressure guard opposed to the knife blade and pivoted to the shank thereof, and formed with a concave cutting edge near its outer end for the purpose described.

ABBOT AUGUSTUS LOW.

Witnesses:
GEO. WM. MIATT,
D. W. GARDNER.